United States Patent Office 3,355,393
Patented Nov. 28, 1967

3,355,393
SMALL SPHERICAL NUCLEAR FUEL PARTICLES
AND PROCESSES OF MAKING SAME
Roger E. Swanson, White Bear Lake, Minn., assignor to Minnesota Mining and Manufacturing Company, St. Paul, Minn., a corporation of Delaware
No Drawing. Filed Sept. 14, 1965, Ser. No. 487,294
20 Claims. (Cl. 252—301.1)

This application is a continuation-in-part of my co-pending application Serial No. 205,119, filed June 25, 1962, now abandoned.

This invention relates to nuclear fuel elements and more particularly to the production of spherical particles for use in nuclear fuel elements.

A useful type of reactor fuel element for atomic reactors contains uranium carbides or other refractory uranium compounds dispersed in small particles throughout a matrix of carbon, metal or the like. Desirably, such particles are of substantially uniform size and shape in order to give the best possible results when incorporated into matrices or otherwise employed. Spherical particles are by far the most desirable in this connection.

Uranium carbides or other refractory uranium compounds may be reduced by grinding or ball milling to irregular particles of extremely small and fairly uniform size. Another method which is known to the prior art for producing particles for use in the preparation of nuclear fuel elements is the flame denitration of uranyl nitrate. The uranium dioxide thus produced has a particle size range from about one-half to ten microns and has been reported as having a surface area of about 2.6 sq. meters per gram. Such particles are of irregular shape and in general are too small to be employed as such for the preparation of spherical fuel particles.

Other heretofore known denitration methods such as fluidized bed dinitrators have been reported to yield particles described as spherical, but so far as is known these are generally rounded rather than regularly spherical.

It is an object of the present invention to provide a process for the production of uranium-containing precursor particles for conversion to spherical refractory particles suitable for use in the production of nuclear fuel elements.

It is another object of this invention to provide a process whereby substantially spherical particles of uranium monocarbide can be produced.

It is a further object of the invention to provide substantially spherical particles containing uranium and other desirable ingredients of nuclear fuel elements in a form adapted for firing to refractory spherular particles.

It is still another object of the invention to provide small spherical particles of uranium trioxide containing additives useful for forming refractory spherical nuclear fuel particles.

Other objects of the invention will be apparent from the disclosures made hereinafter.

In accordance with the above and other objects of the invention, it has been found that solvated uranium salts with anions which are removable by heating, the solvates being fusible at temperatures below the boiling point of the solvating solvent, can be dispersed in molten form in an inert medium to form substantially spherical particles of desirable size, then solidified in the spherical shape and heated at a temperature below the fusing point, preferably under reduced pressure, to remove the solvent of solvation, followed by the removal of the anion. The resulting spherical particles contain the original uranium in the form of uranium trioxide if the removal of the anion is accomplished at temperatures below about 450° C.; it has been found, however, that an amount of uranium dioxide may also be formed. It is to be understood therefore that when reference is made to the uranium trioxide formed in this way, the presence of uranium dioxide is not excluded. Above 450° C., $U_3O_8$ begins to form and if heating is continued above 450° C., $U_3O_8$ will be the major or only product.

The spherical particles produced from the molten solvated uranium salt by the process of the invention range in size from about 10 to 500 microns.

The uranium salts which are useful in the process of the invention include uranyl nitrate and other uranium salts which form solvates (or complexes) with solvents such as water, alcohols, tributyl phosphate, diethyl ether, ketones, esters and the like. Neither the salt employed nor the solvating solvent are critical with respect to the process of the invention, so long as the salt is fusible, the solvating solvent can be removed as by heating at temperatures below that at which the solvated salt melts, and the anion can be removed (i.e., $UO_3$ can be formed from the salt) by heating. Water is the preferred solvating solvent.

It is noted that the uranium and other fissionable materials referred to herein include materials containing greater or lesser amounts of isotopes.

An especially advantageous feature of the process of the invention is that the spherical particles produced which are adapted for firing to produce refractory uranium compounds suitable for use in nuclear fuel elements can contain additive substances which are of importance to the final nuclear reactor fuel element. Thus, for example, carbon can be added to the starting mixture so that uranium carbides will be formed on firing. Carbon can be added in predetermined amount sufficient to produce only uranium monocarbide if desired, as well as to produce uranium dicarbide. Likewise, other additive substances, in finely divided form, broadly definable as refractory metallic oxides, e.g., zirconium oxide, calcium oxide, niobium oxide, plutonium oxide, thorium oxide, manganese dioxide, alumina, beryllia, cerium oxide and the like can be employed to give special properties to the fuel particles. These substances also are incorporated into the initial molten uranium salt solvate, to produce mixtures which are rendered spherical, and then subjected to the desolvation and deanionization steps of the process. Significant or effective amounts, of the order of about 1 percent, up to 50 percent or even somewhat higher, of the additive substance are employed. The resulting microspheres containing uranium trioxide together with added ingredients of nuclear fuels are adapted to be fired to refractory spherules for use in nuclear fuel elements.

Depending on the state of subdivision of the additive, and its effect upon the viscosity of the molten mixture, amounts of additive up to about 50 percent or more, based on the total weight of the mixture, can be incorporated. The amount of additive considered to be a maximum is that which yields a molten mixture which is so viscous that it no longer permits the formation of spherical particles in the range of 10 to 500 microns in diameter from dispersions by the operation of surface tension. Preferably, when carbon is the additive substance, from about 1 to about 15 percent additive is used.

The added nuclear fuel ingredients can be finely divided solids, or can be materials which are soluble in the molten solvated uranium salt. Finely divided, insoluble materials are preferably at least about 1 order of magnitude smaller in size than the diameter of the spherical particles to be made. Homogeneous distribution of the additive in the final spherical particles is the object. Such added materials are required not to be reactive with the molten uranium salt or solvent and under the conditions of formation of spherical particles from the molten mix by the operation of surface tension forces. They may, however, be reactive with the uranium or other ingredients of the mixture during the desolvation and deanionization steps or the firing step in which the uranium compounds are converted to refractory compounds. Such reactive ingredients are exemplified by carbon, which during the firing step referred to reacts with the uranium to produce uranium monocarbide or uranium dicarbide, or thorium, which when present in combination with carbon and uranium produces uranium-thorium carbides of varying composition.

Another highly advantageous feature of the process of the invention is that the spheres which are formed in the first step can be screened and sized, or otherwise classified, and inspected for regularity, prior to conversion to uranium trioxide. In this way, those spherular particles which are not satisfactory can be removed from the mixture, and recycled. Recycling is an important step in promoting the efficiency of the process. It is very desirable that all of the particles which are produced be rather uniform in size or in range and distribution. However, in heretofore known processes, the grading or classification could be done only at a point where the rejected material required chemical modification or uranium recovery procedures before recycling was possible.

Broadly speaking, the process of the invention is carried out by heating the selected uranium salt, for example, uranyl nitrate hexahydrate, until it melts, adding any desired material which is to form part of the ultimate ceramic fuel element particle, and dispersing the resultant molten mixture to form tiny spheres of the order of about 10 to 500 microns in diameter. The dispersed spheres are then stabilized by cooling, whereupon they can be graded, screened, sized, etc. The off-sized, irregular or otherwise rejected particles are recycled to the fusion step. Particles meeting specifications are separated from solvent or carrier material which may be present, and heated to remove the solvent of solvation, followed by heating to higher temperatures to remove the volatile anion and convert the uranium to the oxide form.

The melting or fusion of the solvated uranium salt may occur at a temperature above or below that of the boiling point of the solvating solvent. To avoid loss of solvent, and consequent increase in fusion temperature or solidification of the mass, the fusion is most conveniently accomplished under conditions in which any evaporated solvent is condensed and returned to the fusion vessel, as by reflux. Make-up solvent can be added to keep the proportions of solvating solvent and salt substantially constant.

After fusion, the uranium salt solvate can be dispersed as such, for example, if the final particles desired are to consist of a uranium oxide. Alternatively, the additive materials are introduced at this point, while agitating thoroughly to insure substantial homogeneity of the molten mixture. Thus, for example, finely divided carbon (carbon black) is added for the purpose of providing carbon for reaction with uranium to form uranium carbide at a later time. Because of the tendency for carbon black to agglomerate, agitation is carried out using a high shear mixer at high speed. A grade of carbon is chosen which permits incorporation of the desired amount without undue increase in viscosity of the molten mixture.

After the requisite homogeneity of the fused mixture has been attained, the mixture is dispersed into spherules. This can be accomplished by spraying or otherwise dispersing the hot mixture to form extremely fine droplets, which become spherical by operation of surface tension forces, and which are allowed to fall into a cold medium or are otherwise solidified in spherical form. Suitable media include cold gases, for example, cold air or cold nitrogen, or most conveniently and preferably, a cold, inert liquid. Such liquid, if used, must be inert vis-avis (nonreactive with) the uranium salt or any additive, while the ingredients of the molten mixture must not be soluble in the liquid. Of course, the selected liquid must not be unduly viscous at the temperature selected for solidification of the spherical particles. Usefully, the solvent is highly pure, to avoid contaminating the spherules, and has relatively low viscosity, while having a high heat capacity. Suitable liquids include fluorocarbons, for example, mixed isomers of perfluoro cyclic ethers having the empirical formula $C_8F_{16}O$ (available under the trademark FC–75); hydrocarbons, for example, hexane, heptane, kerosene and the like. Hydrocarbons should be avoided when oxidizing anions are present.

Alternatively, the uranium salt solvate is agitated in a hot liquid medium to form a finely divided dispersion, at a temperature above the melting point of the solvated salt. The liquid chosen must of course be inert, i.e., one which does not dissolve or otherwise adversely affect the dispersed phase. The agitated mixture can then be chilled, or can be sprayed as such into a cold environment.

The medium into which the dispersed particles are introduced is kept at a temperature which will insure solidification and maintaining the spherical form of the particles before they strike the walls of the container or agglomerate. It will be apparent that the size of the container, amount of material dispersed, etc. will be determining factors in the temperature which is required, lower temperatures being required for relatively small amounts of cooling media and higher temperatures being tolerable (so long as they are several degrees below the fusing point) when large amounts of medium are employed compared with the amount of fused mixture which is dispersed.

If a liquid has been used as a medium into which the particles are dispersed and solidified, this liquid can be employed for classification or elutriation purposes. Where a liquid medium has been used, it is preferably but not necessarily removed from the particles before they are introduced into the fusion zone on recycling.

Particles meeting specifications are removed from the solidifying medium and dried if desired; drying as a separate step is not necessary because the liquid is evaporated during subsequent treatment of the spheres. The spheres are placed in a reaction vessel, in which they are gently agitated and heated, preferably under reduced pressure, to remove the solvent of solvation. Atmospheric pressure can also be used. Following removal of this solvent, the temperature is increased to the point at which the anion is volatilized, and the spheres are maintained at this point until the deanionization is substantially complete. The heating in this step is at all times carried out at temperatures lower than the melting point of the spherical material at whatever stage of composition it has reached. The desolvation and deanionization steps can be carried out under stirring, fluidized bed, or any other conditions which increase mass transfer.

After removal of the solvate and deanionization, the spheres which are produced are in condition for further processing to produce refractory uranium compound-containing spheres for use in fuel elements of nuclear reactors.

The process of the invention is illustrated by the following flow diagram.

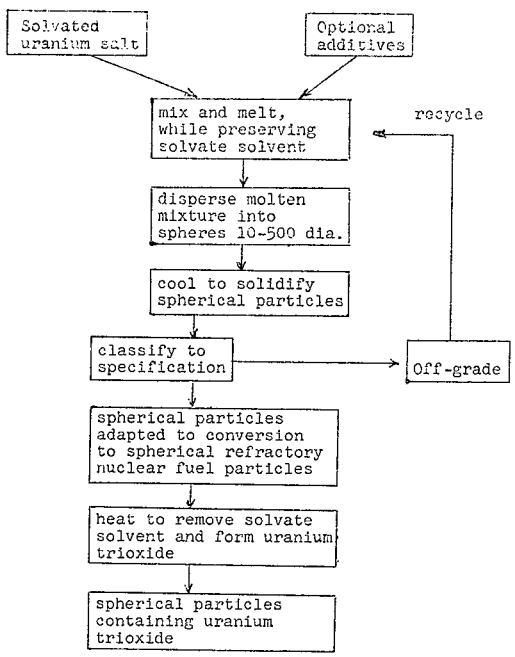

Included within the scope of the invention are the spherical particles of solvated uranium salts, containing additive substances as set forth hereinabove in amount of about 1 to 50 percent or more and adapted to desolvation of the uranium salt and conversion to uranium trioxide, still in spherical form.

Also included within the scope of the invention are the spherical particles of uranium trioxide in admixture with said additive substances, which are adapted to sintering to a spherical particle for use in nuclear reactor fuel elements.

A particularly useful way of further processing is to sinter the desolvated, deanionized spheres at a temperature just below their melting point. Such temperatures range from 800° C. to 2400° C. The sintering can be carried out in a static bed process, and surprisingly it is found that the particles do not agglomerate, but sinter uniformly to spheres. Sintering at about 800°–1800° C. in a hydrogen furnace, $UO_2$ is formed, which incorporates the additive substances which are employed. If the molten starting mixture incorporated amounts of carbon, and the sintering temperature is raised to about 1600°–2400° C., uranium carbides will be formed. Depending upon the amount of carbon added, either uranium monocarbide or uranium dicarbide can be produced. During sintering, the spheres shrink in size in amount up to about 60 percent of their original diameter, but retain their substantially perfect spherical shape.

The following examples will more specifically illustrate the process of the invention and the products produced thereby. In the examples, all parts are by weight unless otherwise specified. Caution should be exercised to avoid the formation of critical masses.

EXAMPLE 1

A mixture is prepared containing 750 parts of uranyl nitrate hexahydrate and 35.8 parts of screened, finely divided "Thermax" brand carbon (a finely divided furnace black). The mixture is placed in a flask provided with a reflux condenser, and heated to 90° C. At this temperature, the uranium nitrate hexahydrate melts, while any water of hydration which escapes is returned to the melting flask. A high shear, bar turbine impeller is rotated in the melt for about 15 minutes at 14,500 r.p.m. to assist in insuring that all agglomerates are broken down. The melt is then ready for spraying to produce spheres of uranium nitrate hexahydrate with included carbon.

The spray nozzle and spray pressure are chosen so as to yield the maximum number of particles in the preselected size range. When using a hollow cone spray nozzle (such as that available under the trademark A–200, available from the William Stinem Manufacturing Co.) a spray pressure of about 37 lbs. per sq. inch produces a useful size range of particles from 50 to 250 microns in diameter.

The spray nozzle and associated fittings are preheated to 90° C. and placed about one inch from the upper surface of the liquid in a vessel about 6 inches in diameter and 3 feet in length containing fluorocarbon FC–75, the temperature of the liquid being maintained at 10° C. For continuous operation, the fluorocarbon liquid is circulated from the vessel through a cooler and back to the vessel. For batch operation, however, the amount of material which is to be cooled determines the volume of cold liquid which is to be used. The molten starting mixture is then sprayed into the cooled liquid, about 5 minutes being required to spray one and one-half pounds of molten material at the temperature and pressure stated and with the spray nozzle used. The molten spray forms spherical particles of uranyl nitrate hexahydrate containing carbon. The spherical particles which are formed settle to the bottom of the vessel where they are removed using a valve located at the lowest point. An amount of liquid remains with the spherical particles, and the slurry thus obtained is spread on trays and the solvent is permitted to evaporate. When dry, the particles are screened through a series of sieves of mesh size 60 to mesh size 270 (Tyler standard screen scale) in a shaking device. Particles retained on the mesh size 60 sieve and which pass the mesh size 270 sieve are recycled, while the remainder of the particles are further processed to remove water of hydration and to denitrate.

The dried spherical particles are placed batchwise in amounts of about 750 parts each into stirred, round-bottom flasks which are provided with means for reduction of pressure. The pressure in the flask is reduced to about 15–30 mm. of mercury, and the stirrer is operated at about 100 r.p.m. to provide gentle agitation. The temperature of the material contained in the flask is then slowly raised from ambient temperature to about 300° C. over the space of about 9 hours, to dehydrate and denitrate the microspherical particles in the solid state. Thus, the temperature is maintained at 40° C. for a sufficient period of time to eliminate the three molecules of the water of hydration which evolve at that temperature, at 80° C. to remove the fourth, at 140° C. to remove the fifth, and 180° C. to remove the last molecule of water of hydration. The progress of the removal can be followed by condensation of the water into a cold trap, so that the temperature will not be raised beyond the requisite point for each step, to avoid any possibility that the material in the flask will fuse. After the water of hydration has been removed, the temperature is raised to 250° C. to 300° C., to accomplish denitration. When denitration is complete as shown by the drop in pressure to a steady state and cessation of the evolution of $NO_2$, the particles are cooled to room temperature.

The particles thus obtained are substantially perfectly spherical, and consist of a mixture of uranium trioxide and carbon. They range in size from about 50 to 250 microns in diameter. They are suitable for further processing into uranium dicarbide spheres, having diameters about 60 percent of those given, which can be employed in the fabrication of nuclear fuel elements by mixing them with graphite to form a fuel element in which the graphite matrix contains the particles of fissionable material dispersed throughout.

EXAMPLE 2

The procedure of Example 1 is repeated making several lots, each of which contains 100 parts of uranyl nitrate hexahydrate and the number of parts of carbon designated in the following table. The nozzle used was a hollow cone spray nozzle (Monarch 1.35, 30° NS) and the pressure used was 22 p.s.i. The composition of the resulting denitrated spheres and their average size are shown in the following table. It will be understood that in each case there is a normal distribution of particle sizes. The carbon employed was the same as that in Example 1.

TABLE I

| Lots | Carbon parts | Sphere composition, moles $UO_3$/moles carbon | Size range (av.), microns |
|---|---|---|---|
| 1 | 0 | 1/0 | 200 |
| 2 | 2.392 | 1/1 | 250 |
| 3 | 4.784 | 1/2 | (2) |
| 4¹ | 7.176 | 1/3 | 190 |
| 5 | 9.568 | 1/4 | 250 |
| 6 | 11.960 | 1/5 | 275 |

¹ 30 p.s.i. used.
² Not determined.

After denitration of lot 1, spheres consisting exclusively of uranium trioxide are formed. They are somewhat smaller in size because the viscosity of the starting mix is a minimum. The lots having increasing amounts of carbon become increasingly viscous, leading to difficulty in producing extremely fine particles when more than 5 moles of carbon are used for each mole of uranyl nitrate hexahydrate. The use of other grades of carbon black can provide higher loadings with low viscosity. The particle size and agglomerative tendencies of the carbon black influence its behavior in this connection. The spherical particles produced can be sintered to uranium carbide.

EXAMPLE 3

The procedure of Example 1 is followed to produce several lots of spherical particles having various compositions. In each case 250 parts by weight of uranyl nitrate hexahydrate are used and the added materials are set forth in the following table, together with the final composition of the spheres after desolvation and deanionization, and after sintering at the temperatures indicated.

TABLE II

| Lot | Additive | Composition after desolvation and deanionization | Sintering temperature | Composition after Sintering |
|---|---|---|---|---|
| 7 | 250 parts <400 mesh niobium oxide | $UO_3+Nb_2O_5$ | 450° C. (does not sinter) | $U_3O_8+Nb_2O_5$. |
| 8 | 100 parts <400 mesh thorium oxide | $UO_3+ThO_2$ | Over 1,500° C., hydrogen furnace. | $UO_2$-$ThO_2$ solid solution. |
| 9 | 24 parts <400 mesh zirconium oxide | $UO_3+ZrO_2$ | 1,500° C., hydrogen furnace. | $UO_2$-$ZrO_2$ solid solution. |
| 10 | 13 parts <400 mesh thorium oxide and 12 parts furnace black. | $UO_3+ThO_2+C$ | 2000–2200° C., vacuum furnace. | $UC_2+ThC_2$. |
| 11 | 50 parts <400 mesh aluminum oxide | $UO_3+Al_2O_3$ | About 1,400° C. hydrogen furnace. | $UO_2+Al_2O_3$ solid solution. |
| 12 | 2.53 parts <400 mesh titanium dioxide | $UO_3+TiO_2$ | About 1,500° C. hydrogen furnace. | $UO_2$ with titania-containing phase at grain boundaries. |
| 13 | 2.53 parts <400 mesh cerium oxide | $UO_3+CeO_2$ | 1,500° C. hydrogen furnace. | $UO_2$ with $CeO_2$ at grain boundaries. |
| 14 | 5.06 parts <400 mesh silicon carbide | $UO_3+SiC$ | 1,500–1,800° C. hydrogen furnace. | $UO_2+SiC$ inclusions. |
| 15 | 20 parts <400 mesh zirconium oxide, 25 parts <400 mesh calcium oxide. | $UO_3+ZrO_2+CaO$ | 1,750° C. hydrogen furnace. | $UO_2+ZrO_2+CaO$, dense multi-phase system. |

It should be noted that while up to about 50 percent by weight, based on the total amount of the mixture, of additives can be incorporated into the molten uranium salt solvate, after removal of the solvent and the anion, the percentage of additive present increases markedly. In the case of uranium nitrate hexahydrate, where 50 percent of additive based on the total weight of the mixture is present, after the removal of water of hydration and the nitrate anion, the percentage of additive present increases to about 65 percent by weight of the total.

EXAMPLE 4

A mixture of 50 parts of uranium nitrate hexahydrate and 5 parts of finely divided (<400 mesh) zirconium oxide is melted with thorough agitation, at about 90° C., conserving the water of hydration by incorporating a reflux condenser into the system. The mixture is sprayed into the upper end of a cylindrical chamber about 3 feet in diameter and 12 feet long, through which is passed in an upward direction, a stream of nitrogen at about 0° C. The small spherical particles are frozen before they reach the bottom of the chamber. By adjusting the flow of nitrogen, the residence time of the particles can be varied. The solidified particles are collected, graded for size and subjected to dehydration and deanionization by heating in steps as described in Example 1, at temperatures just below the melting point of the particles and under about 15 mm. Hg pressure. After removal of the water, the nitrate anion is removed by heating at about 250–300° C. Spherical particles of $UO_3$ containing about 17 percent zirconium oxide are obtained.

What is claimed is:

1. The process for the production of small spherical uranium-containing precursor particles for conversion to spherical nuclear fuel particles, which comprises the steps of:
    (A) melting a fusible solvated uranium salt which decomposes on heating to form uranium trioxide;
    (B) dispersing the molten salt in substantially spherical droplets of the order of about 10 to 500 microns in diameter;
    (C) cooling the molten droplets to solidify in spherical particulate form; and
    (D) heating the solidified particles at a temperature below the melting point thereof to remove the solvent of solvation and convert the uranium salt essentially to uranium trioxide.

2. The process for the production of small spherical uranium-containing precursor particles for conversion to spherical nuclear fuel particles, which comprises the steps of:
    (A) preparing a molten mixture consisting of a fusible solvated uranium salt containing up to about 50 percent based on the total weight of the mixture of a member of the group consisting of finely divided carbon and metallic oxides;
    (B) dispersing the molten mixture in substantially spherical droplets of the order of about 10 to 500 microns in diameter;
    (C) cooling the molten droplets to solidify in spherical particulate form; and
    (D) heating the solidified particles at a temperature below the melting point thereof to remove the solvent of solvation and to convert the uranium salt essentially to uranium trioxide.

3. The process for the production of small spherical uranium-containing precursor particles for conversion to spherical nuclear fuel particles, which comprises the steps of:
    (A) melting hydrated uranyl nitrate;
    (B) dispersing the molten salt in an inert medium in substantially spherical droplets of the order of about 10 to 500 microns in diameter;

(C) cooling the molten droplets to solidify in spherical particulate form; and (D) heating the solidified spherical particles at a temperature below the melting point thereof to remove water of hydration and convert the uranyl nitrate essentially to uranium trioxide.

4. The process for the production of small spherical uranium-containing precursor particles for conversion to spherical nuclear fuel particles, which comprises the steps of:

(A) preparing a molten mixture consisting of hydrated uranyl nitrate containing up to about 50 percent by weight based on the total weight of the mixture of a member of the group consisting of finely divided carbon and metallic oxides;

(B) dispersing the molten mixture in an inert medium in substantially spherical droplets of the order of about 10 to 500 microns in diameter;

(C) cooling the molten droplets to solidify in spherical particulate form; and (D) heating the solidified particles at a temperature below the melting point thereof to remove water of hydration and to convert the uranyl nitrate essentially to uranium trioxide.

5. The process for the production of small spherical uranium-containing precursor particles for conversion to spherical nuclear fuel particles, which comprises the steps of:

(A) melting hydrated uranyl nitrate;

(B) dispersing the molten salt in an inert liquid medium in substantially spherical droplets of the order of 10 to 500 microns in diameter;

(C) cooling the molten droplets to solidify in spherical particulate form;

(D) heating the solidified particles at a temperature below the melting point thereof to remove the water of hydration and convert the uranyl nitrate essentially to uranium trioxide; and (E) sintering the uranium trioxide spheres at a temperature in the range of about 1200 to 1800° C. to form spherical particles of $UO_2$.

6. The process for the production of small spherical uranium-containing precursor particles for conversion to spherical nuclear fuel particles, which comprises the steps of:

(A) preparing a molten mixture consisting of hydrated uranyl nitrate containing up to about 15 percent by weight of finely divided carbon;

(B) dispersing the molten mixture in an inert medium to form substantially spherical droplets of the order of about 10 to 500 microns in diameter;

(C) cooling the molten droplets to solidify in spherical particulate form; and (D) heating the solidified particles at a temperature below the melting point thereof to remove the water of hydration and to convert the uranyl nitrate essentially to uranium trioxide.

7. The process for the production of small spherical uranium-containing precursor particles for conversion to spherical nuclear fuel particles, which comprises the steps of:

(A) melting a fusible solvated uranium salt which decomposes on heating to form uranium trioxide;

(B) dispersing the molten salt in substantially spherical droplets of the order of about 10 to 500 microns in diameter;

(C) cooling the molten droplets to solidify in spherical particulate form;

(D) heating the solidified spherical particles at a temperature below the melting point thereof to remove the solvent of solvation and convert the uranium salt essentially to uranium trioxide; and (E) heating the uranium trioxide spheres to convert them to form $U_3O_8$ in spherical form at a temperature in the range of about 450 to 800° C.

8. The process for the production of small spherical uranium-containing precursor particles for conversion to spherical nuclear fuel particles, which comprises the steps of:

(A) preparing a molten mixture consisting of a fusible solvated uranium salt containing up to about 50 percent based on the total weight of the mixture of a member of the group consisting of carbon and refractory metallic oxides;

(B) dispersing the molten mixture in substantially spherical droplets of the order of about 10 to 500 microns in diameter;

(C) cooling the molten droplets to solidify in spherical particulate form;

(D) heating the solidified spherical particles at a temperature below the melting point thereof to remove the solvent of solvation and to convert the uranium salt essentially to uranium trioxide; and (E) sintering the uranium trioxide-containing spherical particles at a temperature in the range of about 1200 to 1800° C.

9. The process for the production of small spherical uranium-containing precursor particles for conversion to spherical nuclear fuel particles, which comprises the steps of:

(A) preparing a molten mixture consisting of a fusible solvated uranium salt containing up to about 15 percent based on the total weight of the mixture of finely divided carbon;

(B) dispersing the molten mixture in substantially spherical droplets of the order of about 10 to 500 microns in diameter;

(C) cooling the molten droplets to solidify in spherical particulate form; and (D) heating the solidified spherical particles at a temperature below the melting point thereof to remove the solvent of solvation and to convert the uranium salt essentially to uranium trioxide.

10. The process for the production of small spherical uranium-containing precursor particles for conversion to spherical nuclear fuel particles, which comprises the steps of:

(A) preparing a molten mixture consisting of a fusible solvated uranium salt containing up to about 15 percent based on the total weight of the mixture of finely divided carbon;

(B) dispersing the molten mixture in substantially spherical droplets of the order of about 10 to 500 microns in diameter;

(C) cooling the molten droplets to solidify in spherical particulate form;

(D) heating the solidified spherical particles at a temperature below the melting point thereof to remove the solvent of solvation and to convert the uranium salt essentially to uranium trioxide; and (E) sintering the spherical particles containing uranium trioxide and carbon at a temperature in the range of about 1500 to 2400° C. and below the melting point of said particles, to form a uranium carbide.

11. The process for the production of small spherical uranium-containing precursor particles for conversion to spherical nuclear fuel particles, which comprises the steps of:

(A) preparing a molten mixture consisting of a solvated uranyl nitrate containing up to about 50 percent by weight of the mixture based on the total weight of a finely divided solvate-insoluble thorium compound;

(B) dispersing the molten mixture in an inert medium to form substantially spherical droplets of the order of about 10 to 500 microns in diameter;

(C) cooling the molten droplets to solidify in spherical particulate form; and (D) heating the solidified spherical particles at a temperature below the melting point thereof to remove solvent of solvation and to convert the uranyl nitrate to spherical particles containing essentially uranium trioxide, and thorium additive.

12. A small spherical particle having a diameter in the range of about 10 to 500 microns adapted to sintering without melting to a spherical particle having a diameter of about the same order of magnitude as the original particle containing a refractory uranium compound, consisting essentially of uranium trioxide containing from about 1 to 65 percent by weight of an additive substance of the group consisting of carbon and refractory metallic oxides homogeneously dispersed therein in finely divided form, the amount of said additive being from about one up to about 15 percent by weight when said additive is carbon.

13. A small spherical particle having a diameter in the range of about 10 to 500 microns adapted to sintering without melting to a spherical particle of uranium carbide having a diameter of about the same order of magnitude as the original particle, consisting essentially of uranium trioxide admixed with finely divided carbon in amount of from about one up to about 15 percent by weight.

14. A spherical particle according to claim 13, in which the carbon is present in amount sufficient to form uranium dicarbide on sintering.

15. A spherical particle according to claim 13, in which the carbon is present in amount sufficient to form uranium monocarbide on sintering.

16. A spherical particle about 10 to 500 microns in diameter adapted to heating to produce a preform useful for making spherical particles having a diameter of about the same order of magnitude as the original particle containing a refractory uranium compound for use in nuclear fuel elements, consisting essentially of a fusible solvated uranium salt, the said solvent being removable without destroying the spherical form of said particle, and said salt having an anion which is removed on heating to convert the uranium salt essentially to uranium trioxide, and in admixture therewith from about 1 to 50 percent by weight, based on the total weight of the mixture, of a finely divided additive substance of the group consisting of carbon and finely divided refractory metallic oxides, said additive substance being present in amount of not more than about 15 percent by weight when said additive is carbon.

17. A spherical particle according to claim 16, in which the uranium salt is uranyl nitrate.

18. A spherical particle according to claim 16, in which the substance in admixture is carbon.

19. A spherical particle about 10 to 500 microns in diameter adapted to heating to produce a preform useful for making spherical particles having a diameter of about the same order of magnitude as the original particle containing a refractory uranium compound for use in nuclear fuel elements, consisting essentially of hydrated uranyl nitrate and in admixture therewith from about 1 to 15 percent by weight, based on the total weight of the mixture, of a finely divided substance of the group consisting of carbon and finely divided refractory metallic oxides.

20. A spherical particle according to claim 19, in which the substance in admixture is carbon.

References Cited

UNITED STATES PATENTS

| | | | |
|---|---|---|---|
| 2,448,479 | 8/1948 | Wilhelm et al. | 23—349 |
| 3,070,420 | 12/1962 | White et al. | 23—349 |
| 3,097,151 | 7/1963 | Martin | 252—301.1 |
| 3,129,188 | 4/1964 | Sowman et al. | 264—.5 |
| 3,179,722 | 4/1965 | Shoemaker | 264—.5 |
| 3,179,723 | 4/1965 | Goeddel | 264—.5 |

OTHER REFERENCES

Katz et al., The Chemistry of Uranium, 1951, p. 464.

L. DEWAYNE RUTLEDGE, *Primary Examiner.*